T. M. HEARD, Jr.
EYEGLASSES AND SPECTACLES.
APPLICATION FILED SEPT. 16, 1916.

1,270,516.

Patented June 25, 1918.

Inventor
T. M. HEARD Jr.,
by Milton S. Crandall,
Attorney

UNITED STATES PATENT OFFICE.

THOMAS M. HEARD, JR., OF SIOUX CITY, IOWA.

EYEGLASSES AND SPECTACLES.

1,270,516.  Specification of Letters Patent.  Patented June 25, 1918.

Application filed September 16, 1916. Serial No. 120,446.

*To all whom it may concern:*

Be it known that I, THOMAS M. HEARD, Jr., a citizen of the United States, and a resident of Sioux City, in the county of Woodbury and State of Iowa, have invented certain new and useful Improvements in Eyeglasses and Spectacles, of which the following is a specification.

The present invention relates to eye-glasses and spectacles.

In the manufacture of eye-glasses and spectacles of the so-called rimless or skeleton type, the lenses are rigidly secured to the bridges and end-pieces by cement, or by pins or screws which extend through the lenses and the members secured thereto.

This method suffers from defects, chiefly as follows: First,—when rigidly mounted, the lenses are very susceptible to breakage; second,—the lenses are weakened by drilling pin or screw holes adjacent their edges; third,—not only great skill and care, but also expensive drilling equipment is essential, and often the lenses are broken during the process of drilling and mounting.

The objects of the present invention are, therefore, manifold. First,—the production of a lens mounting adapted to endure unusually rough handling and usage and reduce the breakage to the minimum; second,—the production of means for yieldably mounting the lens; third,—the production of an improved mounting which obviates the expensive and hazardous operation of drilling, yet securely holds the lenses.

Furthermore, the invention contemplates a readily attachable and detachable rim adapted for use with any rimless eyeglass or spectacle mounting.

Still another object of the invention is the production of a flexible and substantially invisible rim adapted to be readily attached to, and yet securely hold, a lense and lessen the liability of breakage.

Other important advantages of the invention are that the flexible rims will permit shaping for various patterns and styles of lenses, obviating the necessity of carrying a large stock of assorted shapes of rims; and with my invention lenses which have been broken at the screw, or pin hole may again be used.

The above and other objects and advantages of the invention, consisting in the construction, combination and novel arrangement of parts, will appear from the following disclosure, reference being had to the accompanying drawings, which form a part of this application and in which like characters of reference indicate corresponding parts throughout the several views, of which,—

Figure 1:
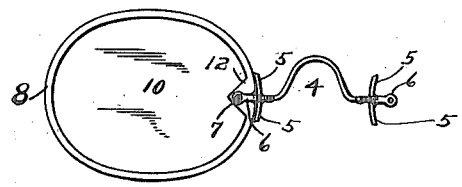
Figure 2:
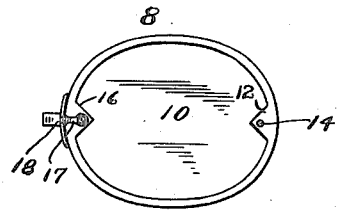
Figure 3:
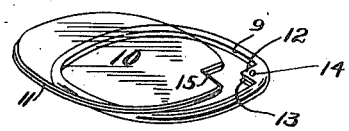

Figure 1 is a front elevation of a pair of eye-glasses constructed in accordance with the invention, one lens and the guards being omitted; Fig. 2 is a similar view of a spectacle lens embodying the invention; and Fig. 3 is a perspective view of a lens positioned as being introduced into its rim.

Although I have illustrated and herein-after described the preferred embodiment of the invention, I would not be understood as being limited to the specific structure chosen for illustration for various alterations and modifications may be made in the details of construction and arrangement of parts, without departing from the spirit and scope of the invention as defined in the appended claims.

Referring now, to the illustrations, 4, is a familiar nose-piece provided with the usual clips, 5, and straps, 6, generally secured to the lens by a screw, 7, passing through one of the straps and a hole in the lens, and threaded into the rear strap, (not shown).

8, is a rim of celluloid, rubber, of other material of a more or less flexible nature, but a light, colorless celluloid is to be preferred. The rim is formed with an inner channel, 9, adapted to receive the edge of the lens, 10, which may be beveled, as at 11.

The rim is formed integrally with an inwardly-extending part, 12, preferably V-shaped and having its edges channeled as at 13. The V-shaped ear is provided with a hole, 14, which, it is evident may be drilled without the aid of highly-skilled labor or expensive equipment, to receive the pin, rivet, or screw, 7.

The lens is formed with a notch, 15, shaped to correspond with the ear, 12 and having beveled edges to enter the channels of the ear.

The spectacle lens presented in Fig. 2 is constructed in like fashion with an ear, 16, for attachment of the usual straps, 17, of the end-piece, 18.

Glasses thus constructed, are far cheaper in manufacture than in the prior art, and will endure unusually rough usage, owing to the fact that the lenses are not rigidly secured to the supporting parts.

Having thus described my invention what I claim as new and desire to secure by Letters Patent of the United States, is,—

1. In articles of the class described, rims for lenses having notched ends, said rims having inwardly extending parts adapted to enter said notches and be secured to the straps of supporting mountings.

2. In articles of the class described, lenses, rims of flexible material mounted on the lenses and having inwardly-extending parts, the lenses having notched edges to receive said parts, and supporting members secured to said inwardly extending parts.

3. In articles of the class described, lenses, rims of flexible material mounted on the lenses and having inwardly-extending V-shaped ears, the lenses having V-shaped notches to receive the ears, and supporting members secured to said parts.

4. In articles of the class described, lenses, rims mounted on the lenses, V-shaped ears of flexible material on the inner sides of the rims, the sides of the ears being grooved, the lenses being provided with V-shaped notches to receive the ears, and the edges of the lenses adjacent the notches being beveled to enter the grooves of the ears, and supporting members secured to the ears.

5. In articles of the class described, bevel-edged lenses, rims of flexible material having grooves to receive the edges, V-shaped parts formed integrally with and extending inwardly from the rims, the edges of said parts being grooved, the lenses being provided with V-shaped notches to receive the ears, and the edges of the lenses adjacent the notches being beveled to enter the grooves of said parts, and supporting members secured to said parts.

6. In articles of the class described, lens rims having inwardly-extending V-shaped flexible ears adapted to be secured to the straps of supporting mountings.

7. In articles of the class described, lenses, rims inclosing the lenses, the ends of the lenses being notched and beveled, and inwardly-extending groove-edged flexible ears on the rims and extending into the notches, the beveled edges of the lenses being inclosed in the grooves of the ears.

8. In a pair of eye-glasses or spectacles, the combination of a pair of rims provided with widened portions on their inner ends in which the additional width is had on the inside of the rim, and a bridge piece secured to the rims at these widened portions.

9. In a pair of eye-glasses or spectacles, the combination of a pair of rims provided with inwardly extending bridge supporting portions, and a bridge secured at its ends to the rims by being fastened to the bridge supporting portions thereof.

10. In a pair of eye-glasses or spectacles, the combination of a pair of rims provided with inwardly extending bridge supporting portions at their inner ends, a bridge whose ends are fastened to the inwardly extending bridge supporting portions, and lenses whose inner ends are cut into and fit around the bridge supporting portions of the rims.

In testimony whereof I have hereunto set my hand this 13th day of September, 1916.

THOMAS M. HEARD, Jr.